Figure 1:
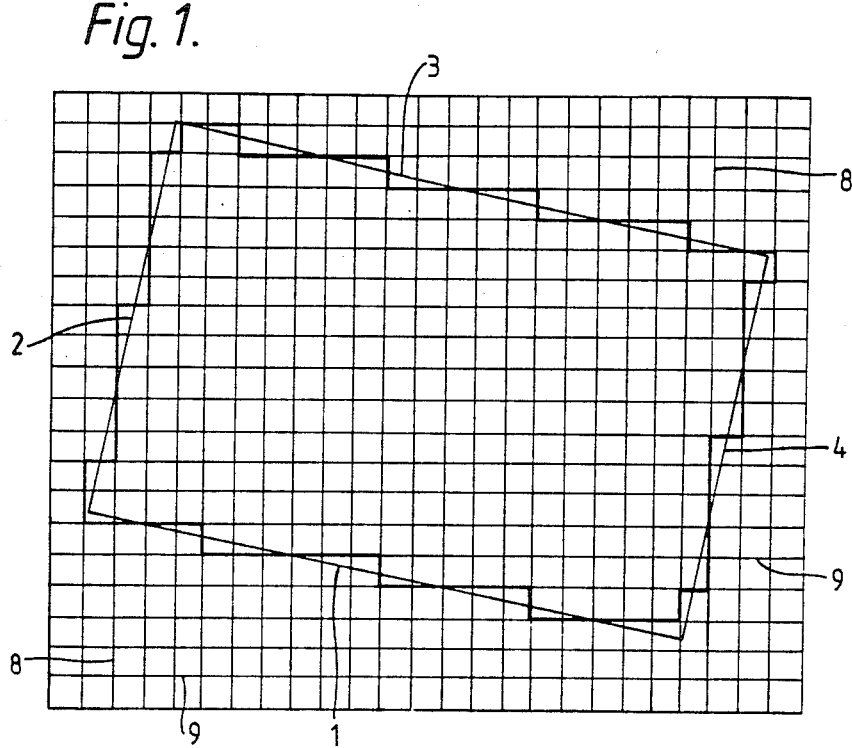

United States Patent [19]

Rosen et al.

[11] Patent Number: 4,781,463

[45] Date of Patent: Nov. 1, 1988

[54] METHOD AND APPARATUS FOR USE IN MEASUREMENT OF THE POSITION OF A LINE OR EDGE OF AN OBJECT

[75] Inventors: Dennis Rosen; John W. Lee, both of London, England

[73] Assignee: Birkbeck College, London, England

[21] Appl. No.: 888,334

[22] PCT Filed: Nov. 20, 1985

[86] PCT No.: PCT/GB85/00534

§ 371 Date: Jul. 16, 1986

§ 102(e) Date: Jul. 16, 1986

[87] PCT Pub. No.: WO86/03287

PCT Pub. Date: Jun. 5, 1986

[30] Foreign Application Priority Data

Nov. 20, 1984 [GB] United Kingdom ............... 8429250

[51] Int. Cl.⁴ .................. G01B 11/00; H04N 7/18
[52] U.S. Cl. ................................. 356/394; 358/107
[58] Field of Search ............ 356/394; 250/560, 561; 358/107; 901/47

[56] References Cited

U.S. PATENT DOCUMENTS

| | | | |
|---|---|---|---|
| 4,238,780 | 12/1980 | Doemens | 340/146.3 H |
| 4,379,308 | 4/1983 | Kosmowski et al. | 358/106 |
| 4,575,751 | 3/1986 | Duschl | 356/394 X |
| 4,613,749 | 9/1986 | Vali | 250/202 |

FOREIGN PATENT DOCUMENTS

| | | |
|---|---|---|
| 0090395 | 3/1982 | European Pat. Off. . |
| 0105661 | 10/1982 | European Pat. Off. . |
| 0115462 | 1/1983 | European Pat. Off. . |
| 1525856 | 7/1975 | Fed. Rep. of Germany . |
| 2035551 | 10/1979 | United Kingdom . |
| 2064762 | 11/1980 | United Kingdom . |
| 2098727 | 4/1982 | United Kingdom . |
| 2102122 | 7/1982 | United Kingdom . |

OTHER PUBLICATIONS

Microelectronics and Reliability, vol. 15, pp. 613 to 618, Pergamon Press, 1976, GB, "The Alignment of Graphic Images in Solid-State Technology", Z. M. Wojcik.
Pattern Recognition, vol. 16, No. 4, pp. 413–420, 1983, G.B., "Subpixel Edge Estimations", P. D. Hyde and L. S. Davis.

Primary Examiner—Eugene R. Laroche
Assistant Examiner—David Mis
Attorney, Agent, or Firm—Nutter, McClennen & Fish

[57] ABSTRACT

In a digitized picture, the orientation of the line is made nearly, but not exactly, parallel to a coordinate axis. Statistical analysis of the grid points or of the lattice points forming the line, preferably the former, gives the position and orientation of the line with high accuracy. Repeated measurements after small displacements of the line allows further improvement of the accuracy. Rectangular objects can be measured by taking differences between positions of opposite edges. The method can be extended to deal with curved lines, areas or the detection and measurement of edge or line features such as angles or properties of arcs. Measurement apparatus for practicing the method is also disclosed.

5 Claims, 2 Drawing Sheets

METHOD AND APPARATUS FOR USE IN MEASUREMENT OF THE POSITION OF A LINE OR EDGE OF AN OBJECT

This invention relates to a method and apparatus for use in measurement. The invention has particular, though not exclusive, application in the measurement of flat objects or flat surfaces of bulky objects when viewed by means of a digitizing television-type system. It is possible to embody the invention in such a way that it may be used, in one application, to monitor the size and shape of objects passing down a production line viewed by a television camera, from above.

There is a growing requirement for automated image analysis and in many applications this involves checking the size and shape of an object constituting an image. Checks of this sort are suitable for computer-control and, to present the image in a form suitable for analysis by computer, the image must be digitized. The digitization may be effected by taking the image acquired by a television camera or similar device and dividing it into picture elements (hereafter called pixels). The pixels are arranged ideally in some regular pattern, of which rectangular or hexagonal arrays are the most common, though others are possible. In an embodiment to be described, a rectangular array of pixels is employed, but the arrangement can readily be modified to apply to other geometries to define a measuring grid or lattice.

The resolution available in a digitized image depends to some extent on the density of the pixel array. The most common systems use square arrays of 256×256 or 512×512 pixels, but some have rectangular windows or square arrays of up to 4096×4096 pixels; however, with normally practicable lenses and cameras it is doubtful whether the true optical resolution is better than can be achieved with a 512×512 pixel raster. Since, in the ideal case of perfect contrast between an object and background on the field of view, any particular pixel would be either "on" or "off", i.e. register as being either inside or outside the object, it may be considered that the resolution of a digitized picture is directly proportional to the inverse of the pixel density and that, for example, the length of an object detected by a 512×512 pixel array could be determined to only about 1 part in 500. This conclusion results from the practice of determining lengths by a point-to-point calculation with the positions of the two points in question each carrying, in this instance, an error of up to unit inter-pixel distance.

It will be seen from the particular embodiments of the present invention to be described that it is possible to determine the position of a line or edge in a digitized picture to a much greater degree of accuracy than plus or minus one unit of distance (the inter-pixel distance) by the use of at least one of three procedures:

(a) by employing many points to make a statistical analysis of the position of the line, (b) in the case of a straight line (or edge), by positioning the line so that it makes a very small angle with one of the coordinate axes and (c) by repeating the measurement an appropriate number of times (e.g. 10 times) with small relative displacements of the camera, the object or the measuring grid or lattice (equivalent to fractions of the inter-pixel distance) between successive measurements.

The distance between two straight lines or edges, which might be the length or breadth of a rectangular object in a digitized picture, can then be obtained as the difference between their respective positions within an error which is a compound of the two separate small errors. When the positions of lines or edges are determined in one of these ways, secondary features such as angles or positions of corners can be determined to a high degree of accuracy. Furthermore, the calculations of line position can be simplified by making use of the distinction in an image between the lattice, on the points of which the pixels are centered, and a grid, which exists between the pixels. This simplification applies particularly to positioning curved lines or edges. In the case of a straight line or edge it is straightforward to calculate the difference in position between a line calculated from lattice points and that calculated from grid points, if the angle between the line and a coordinate axis is known. In either case, the setting of this angle permits the measurement to be made in a manner similar to the employment of a vernier and, by reducing the angle, the measurement can be of an indefinitely high accuracy, although in a practical situation the accuracy might be expected to be to only about 20 times the pixel density, i.e. to about 1 part in 10,000 on a 512×512 pixel array.

Figure 2:
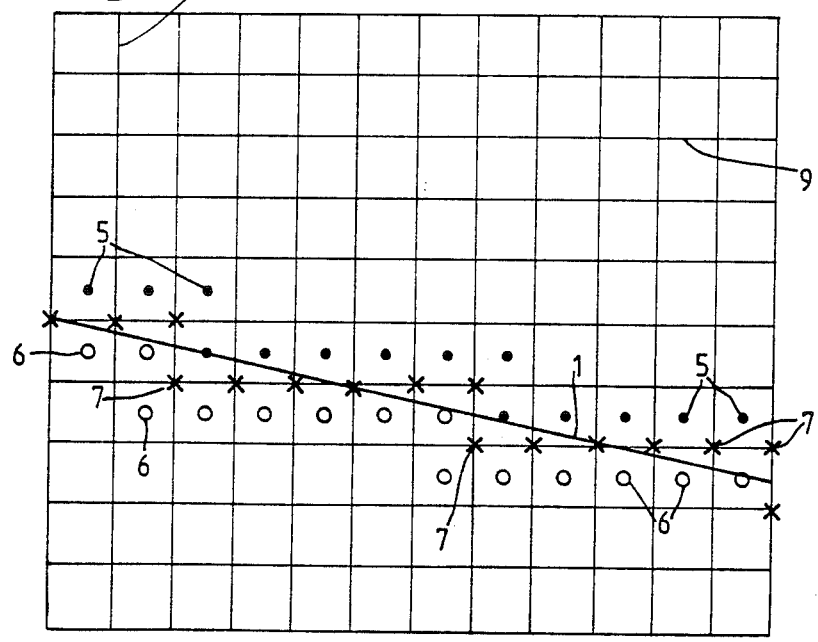

A method of making a measurement in accordance with the present invention will be described below, by way of example, with reference to the accompanying drawings in which:

FIG. 1 is a representation of a picture obtained by digitizing an image of an object viewed by a television camera, and FIG. 2 is a representation in more detail of a part of the picture shown in FIG. 1.

Apparatus used in carrying-out the invention will be described below, by way of example, with reference to FIG. 3 of the accompanying drawings, which shows a block schematic circuit arranged with a diagrammatic side view of an object.

Referring to FIG. 1, it will be understood that the requirement is to monitor the length and breadth of a panel represented by an image having sides 1, 2, 3 and 4 and the parallelism of its sides.

Referring to FIG. 2 which shows a part of the side 1, the filled circles 5 mark the centers of pixels forming an interior "border" of the digitized image of the panel, the open circles 6 mark an exterior "border" and the line 1 shows where the true edge of the image of the panel falls. These two sets of circles may be considered to mark lattice points. Either set may be used to calculate the position of a line, but either of the lines derived from such calculations may be distant from the line 1 marking the true edge of the panel by an amount up to $\sqrt{2}/2$ times the unit length of the lattice-grid network. However, it is readily seen that the small crosses 7 in FIG. 2, marking the cross-over points of a grid 8,9 straddle the line of the true edge and a calculation of the best line through the grid points is very close to the line 1 of the true edge of the image. Whether the true line 1 is estimated from lattice points 5 and 6 or grid points 7, the error depends on the number of points used and the angle between the true edge 1 and the lattice-grid network 8,9. Suppose that a sufficient number of lattice 5,6 or grid 7 points is available to minimize any variation due to the number of points, then, for a calculation based on lattice points, the error in positioning the line 1 falls from 0.71 units when the line is inclined at 45° to 0.50 units when it is at 0° to a line of lattice points 5,6. However, for a calculation based on grid points the positional error falls from 0.71 units at 45° inclination, linearly to zero as it approaches 0° inclination, to a grid line 8,9; although at exactly 0° the error is 0.50 units, as for the lattice point calculation. The method of measurement, in the particular embodiment, is to observe the panel at an inclination not more than a few degrees away from parallelism with the lattice grid network. The positions of the sides can be measured to within a small fraction of a unit and the dimensions of the panel obtained to high accuracy. At the same time, the inclinations of the sides of respective lattice or grid lines can be measured and the parallelism or otherwise of the sides ascertained.

Should the object to be examined be bounded by sides that are not straight, its edges can be monitored within tolerance limits by the same method, provided that the lines of the edges bounding the object can be expressed by a mathematical equation. Circles, for example, with radii of 100 units can be measured to 1 part in 10,000 in respect to radius, or to within 0.01 units in respect of the location of the center. The method can be applied to circular arcs (so obtaining curvature) but with an accuracy depending on the length of arc available.

Segments, or lengths of edge, of flat objects for which there may be a need to check dimensions normally lie either between distinctive marks which may be recognized by (or be made recognizable by) a TV camera system, or else between corners or indentations. The use of a grid boundary of an object (rather than either an interior or exterior lattice boundary) makes the identification of corners or nodes very easy. There are many ways of arriving at an identification, but passing a sequence of grid boundary elements through an appropriate digital filter enables the result to be achieved simply and economically. Once the points have been identified, by whatever method, the position of the edge between two adjacent points, the distance along it, the shape of the edge, or the area of a segment, can be computed, as mentioned above, using the grid points either for a straight edge (as in FIG. 2) or for a curved one.

Figure 3:
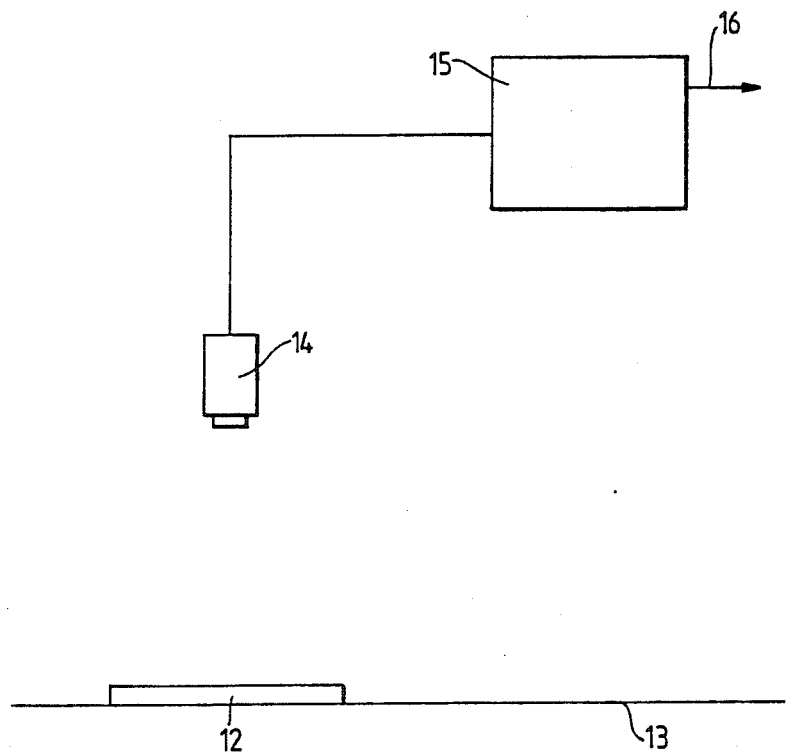

Referring now to FIG. 3, there is shown an object 12 arranged on a surface 13. Above the object, there is a camera 14 having an array of light sensitive elements upon which an image of the object 12 appears. The lighting of the object and the color of the sampling surface are such that the image formed in the camera is sharp and well contrasted. The light sensitive elements in the camera are arranged in an array of required pixel density that forms the basis of a digitizable coordinate system. The output of the camera is applied to the input of an image analyser and computer 15. A suitable image analyser and computer is sold by Buehler Ltd of Illinois, U.S.A. under the trade name Omnimet.

In a preferred embodiment, the picture signals are stored in the analyzer and computer 15 while the analysis takes place.

The information resulting from the analysis, which relates the representation of the object 12 to the co-ordinate system, is obtained from an output 16 and may be fed, for example, to a printer (not shown) where it is recorded. In a particular application where a tolerance is being checked, an output signal from 16 is arranged to operate an alarm device (not shown) which indicates that a tolerance has been exceeded.

It will be understood that the digitizable coordinate system may be separate from the means, such as camera 14, for changing the visual image into digital data. The coordinate system may be an array associated with the object 12 and the representation of the object which is converted into digital data may be a shadow of the object whose position bears a known relationship to the coordinate system array.

In arrangements measuring the length or position of a straight line, or the straight edge of object, although it is possible to operate the method with the line arranged at any angle less than 45° with respect to an axis of the coordinate system, improved results are obtained when the angle is less than 10° and preferably less than 5°.

It will be appreciated that by relating digital data derived from one part of a representation of an object to digital data derived from a coodinate system of high resolution, such as 512×512 pixel raster, it is possible to produce information about the object to a high degree of accuracy.

By relating digital data derived from a second part of the representation of the object to the data derived from the coordinate system, it is possible to produce second information about the object to a similar high degree of accuracy and to relate the two pieces of information to one another in order to determine the distance between the two parts.

It is also possible to repeat these operations a number of times either with or without relative movement between the imaging device, the object or the measuring grid or lattice, and thereby to make a statistical analysis of the information and improve its accuracy.

Furthermore, by arranging that there is a comparatively small, i.e., less than 45° and preferably less than 5° angular relationship between a straight edge and an axis of coordinate system (lattice or grid) it is possible to achieve extremely accurate results, as the following analysis explains.

Considering a digitized picture of a flat object with a pair of parallel or near-parallel edges, the method outlined above can determine the position of each edge accurately. There are many ways of writing the equation of the edge, but for simplicity of calculation we can take the form $$x \sin\theta_1 - y \cos\theta_1 = p_1.$$

In this form, $\theta_1$ is in the angle between the edge and the x-axis and $p_1$ is the length of the perpendicular from the origin of coordinates onto the line. The calculated position of the edge, obtained from the digitized picture will be $$x \sin\theta'_1 - y \cos\theta'_1 = p'_1$$

where $p'_1 = p_1 + \delta_1$ and $\theta'_1 = \theta_1 + \epsilon_1$ and $\delta_1$ and $\epsilon_1$ are observational errors. Similarly, the second edge will be calculated to be $$x \sin\theta'_2 - y \cos\theta'_2 = p'_2.$$

In monitoring a rectangular panel, the first check is of the parallelism of the sides. A modest number of grid points (less than 100) will give angular errors $\epsilon_1$ and $\epsilon_2$ less than 0.02°, which would be accurate enough for most purposes, allowing divergence or convergence of the edges at a rate of less than 5 parts per 10,000 (i.e. 5 mm in 10 m). Assuming that the edges were within the tolerance of parallelism, their distance apart would be given by $p'_2 - p'_1$ and the error in this estimate would be $\delta_T = \sqrt{\delta_1^2 + \delta_2^2}$. For $\delta_1 = \delta_2 = 0.05$ we have $\delta_T = 0.07$. The $\delta$-values are absolute, so it is advisable to make $p'_2 - p'_1$ as large as conveniently possible. Thus with $p'-p'_1 \approx 200$, the error is about 1 part in 3000 and it would be correspondingly less if $p'_2-p'_1$ were greater.

In the case of measuring both length and breadth for a rectangular panel it might not be possible to have $p'_2-p'_1$ for the width, say, large enough if the corresponding length measurement, $p''_2-p''_1$, say, were to be measured from the same digitized picture. In such cases, it might be necessary to make separate measurements, at different magnifications, of length and width.

It will be understood that, although the invention has been described with reference to particular arrangements, by way of example, variations and modifications may be made within the scope of the accompanying claims; for example, where there is relative movement between an imaging device, the object of the coordinate system, the information may be derived during or after the movement. It will be appreciated that views from other directions than above may be taken and analyzed, for example from the side.

We claim:

1. A method of measuring the position of a line or an edge relative to a coordinate reference system, said method including the steps of arranging the line or edge, or an image thereof, and the coordinate system in relative overlapping positions with, in the case of a line, the line out of line with an axis of the coordinate system, and establishing the distance between each of a plurality of points on the line or edge and an adjacent coordinate of the reference system, thereby to establish first information defining the position of the line or edge relative to the coordinate system.

2. A method as defined in claim 1 including the steps of arranging a second line or edge, or an image thereof, and the coordinate system in overlapping positions with, in the case of a line, the second line out of line with an axis of the coordinate system, and establishing the distance between each of a plurality of points on the second line or edge and an adjacent coordinate of the reference system, thereby to establish second information defining the position of the line or edge relative to the coordinate system, and determining the relationship between the first-mentioned and the second line or edge from the first and second informations.

3. A method as defined in claim 1 or 2 wherein a line or straight edge is arranged at an angle of less than 10° with reference to an axis of the coordinate system.

4. A method as defined in claim 1 or 2 including repeating a plurality of times the step of establishing the distance between each of a plurality of points on the line or edge and an adjacent coordinate, each repetitive step being made after relative movement or apparent relative movement has taken place between the overlapping line or edge and the coordinate system from their previous relative position, and making a statistical analysis of the results obtained.

5. Apparatus for use in carrying out a method as claimed in claim 1 or 2 including a camera arranged to view a line or edge and relate the line or edge to a digitizable coordinate system and means to analyze the result of the relationship and to produce output information representative thereof.

* * * * *